United States Patent [19]

De Wan

[11] Patent Number: 4,978,265

[45] Date of Patent: Dec. 18, 1990

[54] SLEEVE ANCHOR FOR SCREW

[76] Inventor: Thomas E. De Wan, 5945 Carrier St., St. Petersburg, Fla. 33714

[21] Appl. No.: 372,652

[22] Filed: Jun. 28, 1989

[51] Int. Cl.$^5$ .................... F16B 13/06; F16B 37/04
[52] U.S. Cl. ..................................... 411/60; 411/61; 411/182; 411/510
[58] Field of Search .................. 411/41, 57, 60, 61, 411/71, 72, 182, 442, 508–510, 913

[56] References Cited

U.S. PATENT DOCUMENTS

| | | | |
|---|---|---|---|
| 1,166,525 | 1/1916 | Joseph | 411/61 |
| 2,386,922 | 10/1945 | Andrews et al. | 411/15 |
| 2,511,512 | 6/1950 | Poupitch | 411/508 |
| 2,788,047 | 4/1957 | Rapata . | |
| 2,830,485 | 4/1958 | Macy . | |
| 2,836,214 | 5/1958 | Rapata . | |
| 2,956,605 | 10/1960 | Rapata . | |
| 3,187,620 | 6/1965 | Fischer | 411/60 |
| 3,217,584 | 11/1965 | Amsbury | 411/508 |
| 3,315,558 | 4/1967 | Fischer | 411/15 |
| 3,449,799 | 6/1969 | Bien | 411/510 |
| 3,618,443 | 11/1971 | Fitzner | 35/5 |
| 4,263,833 | 4/1981 | Loudin et al. | 411/41 |
| 4,430,033 | 2/1984 | McKewan | 411/61 |
| 4,579,492 | 4/1986 | Kazino | 411/60 |

FOREIGN PATENT DOCUMENTS

| | | |
|---|---|---|
| 3102187 | 8/1982 | Fed. Rep. of Germany . |
| 1408602 | 9/1964 | France . |
| 1089586 | 11/1967 | United Kingdom . |

Primary Examiner—Neill R. Wilson
Attorney, Agent, or Firm—Senniger, Power, Leavitt & Roedel

[57] ABSTRACT

An anchor adapted for insertion in a hole through the wall. The wall includes inner and outer surfaces with the hole extending inwardly through the wall from the outer surface of the wall to the inner surface of the wall. The anchor comprises a head, a body, and a passage through the head and body into which a fastener, such as a screw, is adapted to be inserted. The passage has a central longitudinal axis. A surface on the head is engageable with the outer surface of the wall when the body of the anchor is inserted in the hole. At least one resiliently flexible leg extends axially of the body and terminates in a free end moveable generally radially inward and outward relative to the central axis of the body. The anchor also has a holder adjacent to the free end of the leg. The holder projects laterally outwardly from the leg. The leg is adapted to resiliently flex generally radially inwardly as the body is inserted in the hole to a point where the holder exits the hole on the inside surface of the wall. The leg, thereafter, is adapted to resiliently snap generally radially outwardly to a locking position where the holder extends beyond the hole and overlaps the inside surface of the wall to prevent the body from being pulled back through the hole. The distance between the wall-engaging surface of the head and the holder is essentially identical to the thickness of the wall so that when the holder is in the locking position the anchor cannot be moved axially with respect to the hole in the wall.

20 Claims, 2 Drawing Sheets

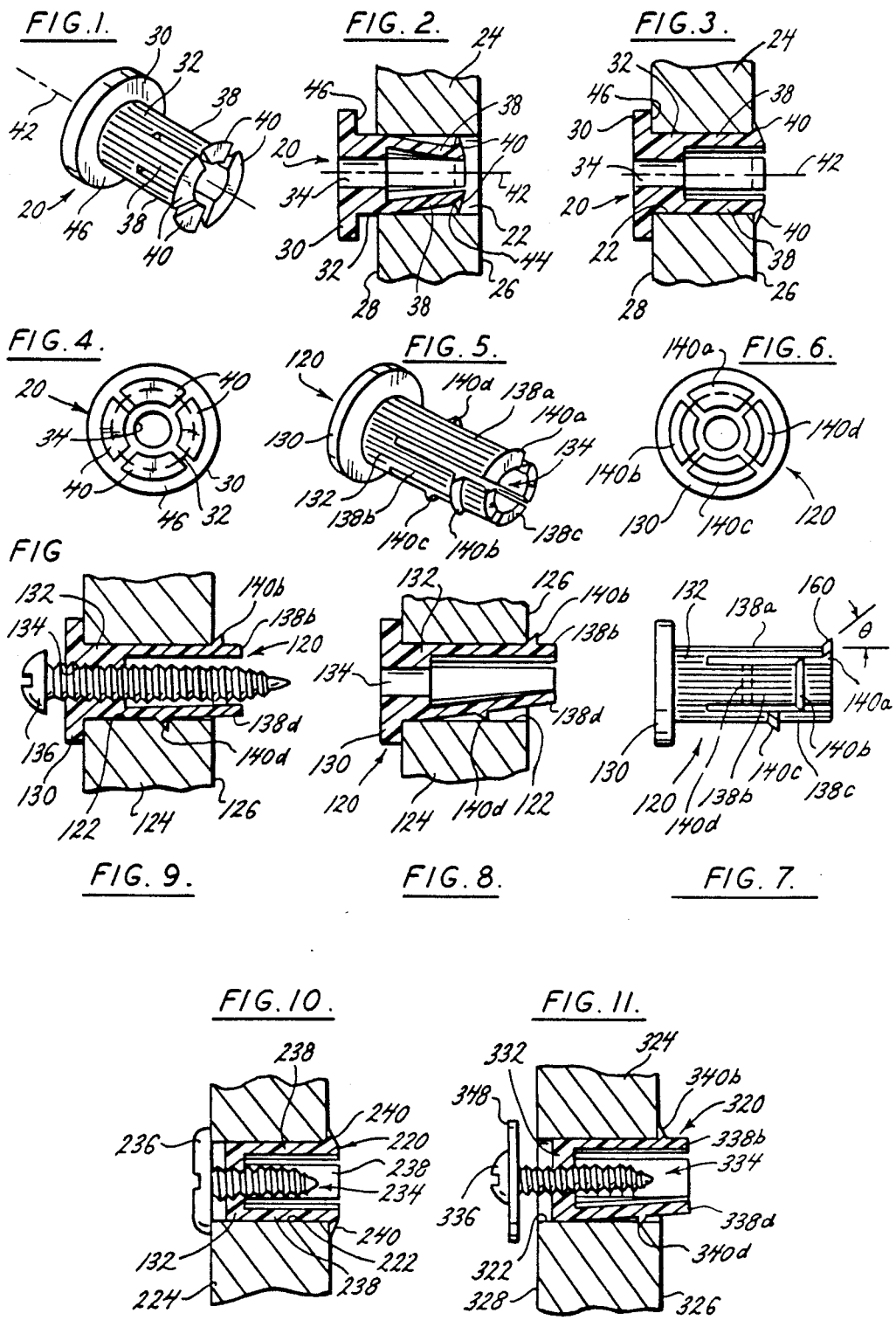

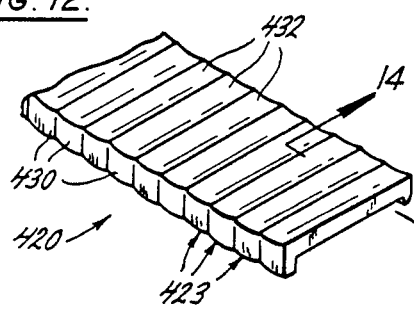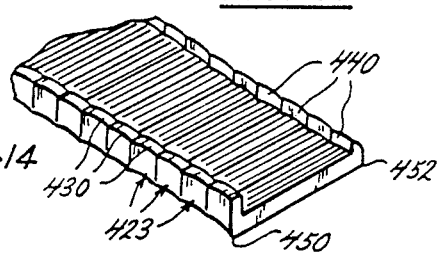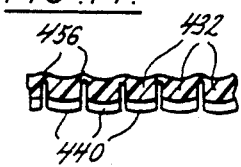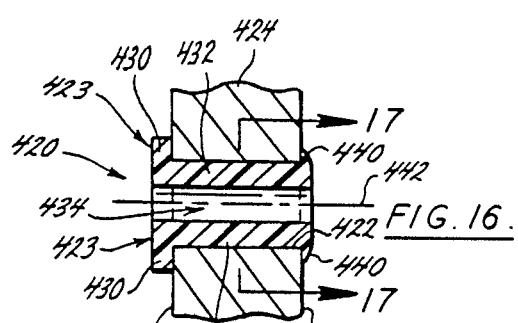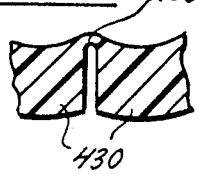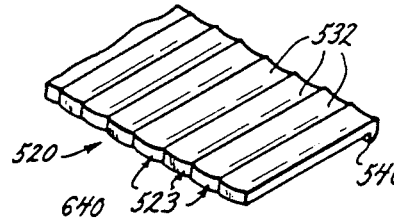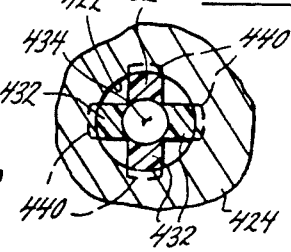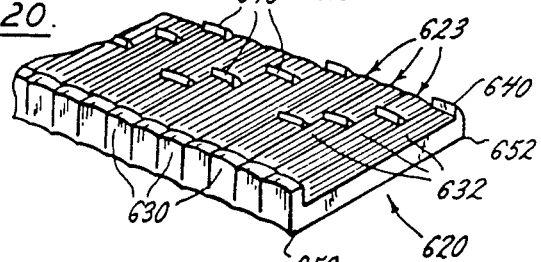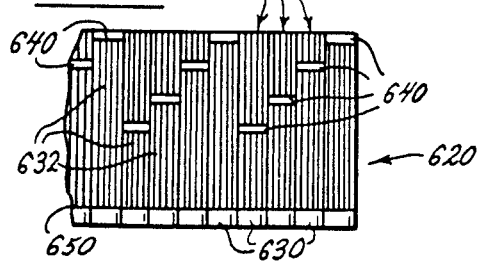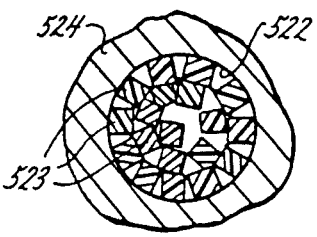

SLEEVE ANCHOR FOR SCREW

BACKGROUND OF THE INVENTION

This invention relates generally to anchors for fasteners such as screws, and in particular to anchors adapted for insertion into holes through walls.

Walls made of a friable material, such as drywall, are generally not strong enough to retain screws, nails, or other such fasteners fastened directly to the walls. As a result, articles fastened directly to walls by screws are easily pulled from the walls.

Various screw anchors have been used to prevent screws from being pulled from such walls. Such an anchor is typically inserted into a hole in a wall and has an aperture for receiving a screw. The screw, as it is threaded through the aperture, urges a shank portion of the anchor outward and against the wall. Thus, the screw is securely fastened to the wall. A problem with such an anchor is that it is liable to fall out of the hole before the screw is inserted into the anchor. Nothing retains it in the hole before the screw is inserted. Any likelihood of the anchor falling out of the hole makes the anchor more difficult to work with—especially when the anchor is to be placed in a hard-to-reach location.

Another problem with such an anchor is that it generally cannot accommodate walls of different thicknesses. One size anchor can generally only accommodate one size wall. Therefore, a user might have to stock many sizes of anchors if he hopes to have the correct size when needed.

Another problem is that such an anchor can generally only accommodate a particular size hole in a wall. If the hole is of different size the user must use an anchor of correspondingly different size

SUMMARY OF THE INVENTION

Among the objects of the present invention may be noted the provision of an improved anchor for insertion in a hole through a wall; the provision of such an anchor which, unassisted by a fastener such as a screw, snaps in a locking position when inserted in the hole; the provision of such an anchor which is adapted to accommodate walls of different thicknesses; and the provision of such an anchor which is adapted to accommodate holes of different diameters.

Generally, an anchor of the present invention is adapted for insertion in a hole through a wall. The wall is of predetermined thickness and includes inner and outer surfaces with the hole extending inwardly through the wall from the outer surface of the wall to the inner surface of the wall. The anchor comprises a head, a body, and a passage through the head and body into which a fastener, such as a screw, is adapted to be inserted. The passage has a central longitudinal axis. A surface on the head is engageable with the outer surface of the wall when the body of the anchor is inserted in the hole. At least one resiliently flexible leg extends axially of the body and terminates in a free end movable generally radially inward and outward relative to the central axis of the body. The anchor also has a holder adjacent to the free end of the leg. The holder projects laterally outwardly from the leg. The leg is adapted to resiliently flex generally radially inwardly as the body is inserted in the hole to a point where the holder exits the hole on the inside surface of the wall. The leg, thereafter, is adapted to resiliently snap generally radially outwardly to a locking position wherein the holder extends beyond the hole and overlaps the inside surface of the wall to prevent the body from being pulled back through the hole. The distance between the wall-engaging surface of the head and the holder is essentially identical to the thickness of the wall so that when the holder is in the locking position the anchor cannot be moved axially with respect to the hole in the wall.

In a second aspect of this invention, the anchor comprises a body having a passage therethrough into which a fastener, such as a screw, is adapted to be inserted, a plurality of resiliently flexible legs, and a series of holders on the legs projecting laterally outwardly from the legs. The passage has a central longitudinal axis. The legs extend axially of the body and terminate in free ends movable generally radially inward and outward relative to the central axis of the body. The holders are spaced at intervals axially of the body for accommodating walls of different thicknesses. The legs are adapted to resiliently flex generally radially inwardly as the body is inserted in the hole to a point where at least one of the holders exits the hole on the inside surface of the wall. The legs, thereafter, are adapted to flex generally radially outwardly to a position where the holder extends beyond the hole and overlaps the inside surface of the wall to prevent the body from being pulled back through the hole.

In a third aspect of the invention the anchor comprises a series of anchor members. Each anchor member has an elongate body and a holder spaced lengthwise of the body from one end of the body and projecting laterally outwardly from the body at one side of the body. The members are integrally and flexibly attached to one another in side-by-side relation to form a strip of interconnected anchor members. The strip is adapted to be rolled up to form a roll of anchor members with the holders of the anchor members projecting generally radially outwardly relative to the central longitudinal axis of the roll. The roll is adapted to be inserted in a hole through a wall with the roll defining a passage into which a fastener, such as a screw, may be threaded. The fastener, as it is threaded into the passage, is adapted to force the anchor members radially outwardly to a position where one or more of the holders are engageable with an inner surface of the wall to secure the roll in fixed position in the hole. The strip can be cut to any desired size to accommodate holes of different widths.

These and other advantages will be in part apparent and in part pointed out hereinafter.

BRIEF DESCRIPTION OF THE DRAWINGS

FIG. 1 is a perspective view of an anchor constructed according to the principles of the present invention;

FIG. 2 is a cross-sectional view of the anchor of FIG. 1 partially inserted in a hole through a wall;

FIG. 3 is a cross-sectional view of the anchor of FIG. 1 fully inserted in a hole through the wall;

FIG. 4 is an end view of the anchor of FIG. 1;

FIG. 5 is a perspective view showing another anchor constructed according to the principles of the present invention, the anchor having a series of holders spaced at intervals along the anchor for accommodating walls of different thicknesses;

FIG. 6 is an end view of the anchor of FIG. 5;

FIG. 7 is a side elevation view of the anchor of FIG. 5;

FIG. 8 is a cross-sectional view of the anchor of FIG. 5 inserted in a hole through a wall;

FIG. 9 is a cross-sectional view similar to FIG. 8 in which a screw is inserted in a passage through the anchor;

FIG. 10 is a cross-sectional view showing another anchor of the present invention which is similar to the anchor of FIG. 1 except it is headless;

FIG. 11 is a cross-sectional view showing another anchor of the present invention which is similar to the anchor of 5 except it is headless;

FIG. 12 a perspective view showing another anchor of the present invention in which the anchor comprises a series of anchor members adapted for insertion in a wall of predetermined thickness;

FIG. 13 is another perspective view of the anchor of FIG. 12;

FIG. 14 is an enlarged cross-sectional view taken along the plane of line 14—14 of FIG. 12;

FIG. 15 is a partial front elevational view of the anchor of FIG. 12 showing heads of two adjacent anchor members;

FIG. 16 is a cross-sectional view showing a series of anchor members of the anchor of FIG. 12 with the members being up within a hole in a wall;

FIG. 17 a cross-sectional view taken along the plane of line 17—17 of FIG. 16;

FIG. 18 is a perspective view showing another anchor of the present invention in which the anchor is similar to the anchor of FIG. 12 except it is headless;

FIG. 19 is a front elevation view of the anchor of FIG. 18 rolled up within a hole in a wall;

FIG. 20 is a perspective view showing another anchor of the present invention in which the anchor comprises a series of anchor members with a holder on each member for accommodating walls of different thicknesses; and FIG. 21 is a plan view of the anchor of FIG. 20.

Corresponding reference numerals indicate corresponding parts throughout the several views of the drawings.

DETAILED DESCRIPTION OF THE PREFERRED EMBODIMENT

An anchor constructed according to the principles of this invention is indicated generally as 20 in FIGS. 1-4. The anchor 20 is adapted for insertion in a hole 22 of a wall 24 of predetermined thickness. The wall 24 has inner and outer surfaces 26 and 28. The hole 22 extends inwardly through the wall 24 from the outer surface 28 to the inner surface 26. The anchor 20 comprises a head 30, a body 32, a passage 34 through the head 30 and body 32 into which a screw (not shown) or some other fastener, such as a nail, is adapted to be threaded or inserted, resiliently flexible legs 38 extending from the body 32, and feet (or holders) 40 projecting laterally from the legs 38. Preferably, the anchor 20 is a one-piece member of molded plastic construction. If anchor 20 is to be used to secure a nail to wall 24, it is advisable that the nail engaging surface of anchor 20 be made of a high friction material such as rubber to prevent slippage of the nail; to accomplish this anchor 20 could be made entirely of or coated with such material.

The body 32 has a central longitudinal axis 42 and is generally cylindric in shape. The surface of the body 32 has a plurality of longitudinal ridges or ribs (shown in FIG. 1) to prevent the anchor 20 from rotating within the hole 22. Each leg 38 is an integral extension of the body 32 and has an arcuate cross section. The legs 38 extend axially of the body 32 and terminate in free ends (designated generally at 44) movable generally radially inward and outward relative to the central axis 42. The feet 40 are adjacent to the free ends 44 of the legs 38 and project laterally outwardly from the legs 38. As shown in FIG. 2, the legs 38 are adapted to resiliently flex generally radially inwardly as the body 32 is inserted in the hole 22. When the feet 40 reach a point where they exit the hole 22 on the inner surface 26 of the wall 24 (as shown in FIG. 3), the legs 38 resiliently snap generally radially outwardly to a locking position. In such position, the feet extend beyond the hole 22 and overlap the inner surface 26 of the wall 24 to prevent the body 32 from being pulled back through the hole 22. A surface 46 on the head 30 engages the outer surface 28 of the wall 24 when the body 32 is inserted in the hole 22. The distance between the surface 46 of the head 30 and the feet 40 is essentially identical to the thickness of the wall 24 so that when the feet 40 are in the locking position the anchor 20 cannot be moved axially with respect to the hole 22 in the wall 24. Thus, the anchor 20 is retained in the hole 24 independently of the fastener. Although not shown, it is to be understood that the fastener, in conjunction with the anchor 20, is used to secure an article to the wall 24.

Another embodiment of an anchor constructed according to the principles of this invention is indicated generally at 120 in FIGS. 5-9. The anchor 120 is similar to the anchor 20 of FIGS. 1-4, but anchor 120 can accommodate walls of different thicknesses. To simplify the description of this embodiment, corresponding parts are numbered the same as those parts shown in FIGS. 1-4 except the prefix "1" has been added to the reference numbers.

The anchor 120 comprises a head 130, a body 132, a passage 134 through the head 130 and body 132, legs 138a-138d extending from the body 132, and a series of feet (or holders) 140a-140d projecting laterally from the legs 138a-138d, respectively. The legs 138 extend axially of the body 132 and terminate in free ends movable generally radially inward and outward. The feet 140a-140d are spaced at intervals axially of the body 132 for accommodating walls of different thicknesses. The legs 138a-138d are adapted to resiliently flex generally radially inwardly as the body 132 is inserted in a hole.

As shown in FIG. 8, when anchor 120 is inserted into a hole 122 to the point where at least one of the feet (such as foot 140b) exits the hole 122 on the inner surface 126 of a wall 124, the leg 138b flexes generally radially outwardly to a locking position. In such position, the foot 140b extends beyond the hole 122 and overlaps the inner surface 126 of the wall 124 to prevent the body 132 from being pulled back through the hole 122. If the wall 124 were thicker, the foot 140a would be the only foot to exit the hole 122 and engage the inner surface 126 of the wall 124. If the wall 124 were thinner, foot 140c and/or foot 140d would also exit the hole 122 and engage the inner surface 126. Thus, the anchor 120 can accommodate walls of different thicknesses. Once the anchor 120 is inserted in the hole 122, a screw 136 (shown in FIG. 9) is then threaded through the passage 134. Insertion of the screw 136 urges the inwardly flexed legs (such as leg 138d) radially outwardly to drive the corresponding feet (such as foot 140d) into the wall 124, which is typically (albeit not necessarily) drywall. Although anchor 120 is described as securing screw 136 to wall 124, it is to be understood that a nail or some other type of fastener could also be secured with such anchor.

Preferably, each foot 140a–d includes a surface 160 which slopes forward and outward and forms an acute angle r with respect to the horizontal, as shown in FIG. 7. With the screw 136 removed, the anchor 120 can be disengaged from the wall 124 by pulling axially rearwardly on the anchor 120. As the anchor is pulled rearwardly, the sloping surfaces 160 of the feet are engageable with the wall 124 to cam the feet inwardly out of engagement with the wall to permit the anchor to be removed from the hole in the wall. If angle r is small, the anchor 120 can be removed easily. If angle r is larger, removal is more difficult. Although the anchor 120 can be disengaged from the wall 124 when the screw 136 is removed, it cannot be removed when the screw 136 is inserted because the screw 136 prevents the legs 138a–d from deflecting inwardly.

FIG. 10 shows another embodiment of an anchor, designated generally at 220, constructed according to the principles of this invention. The anchor 220 is similar to the anchor 20 of FIGS. 1–4 except the anchor 220 is headless. For convenience, corresponding parts are numbered the same as those parts shown in FIGS. 1–4 except the prefix "2" has been added to the reference numbers.

The anchor 220 is adapted to be inserted in a hole 222 through a wall 224. The anchor 220 comprises a body 232, a passage 234 through the body 232 for receiving a screw 236, legs 238 extending axially from the body 232, and feet 240 projecting laterally from the legs 238. The anchor 220 is inserted into the hole 222 with the screw 236 at least partially threaded into the passage 234. The screw 236 and anchor 220 are pushed axially to a point where the feet 240 exit the hole 222 on an inner surface 226 of the wall 224. The legs 238 then resiliently snap generally radially outwardly. Once the feet 240 exit the hole 222, the screw 236 is tightened against the wall 224 to urge the feet 240 against the inner surface 226 of the wall. Thus, the screw and anchor are secured tightly against the wall 224.

FIG. 11 shows another embodiment of an anchor, designated generally at 320, constructed according to the principles of this invention. The anchor 320 is similar to the anchor 120 of FIGS. 5–9 except the anchor 320 is headless. For convenience, corresponding parts are numbered the same as those parts shown in FIGS. 5–9 except the prefix "3" has been substituted for the prefix "1" in the reference numbers.

The anchor 320 is adapted to be inserted in a hole 322 through a wall 324. The anchor 320 comprises a body 332, a passage 334 through the body 332 for receiving a screw 336 or some other fastener, legs 338a–338d extending axially from the body 332, and a series of feet 340a–340d projecting laterally from the legs 338. The feet are spaced at intervals axially of the body 332 for accommodating walls of different thicknesses and for gripping the wall. The anchor 320 is inserted into the hole 322 with the screw 336 at least partially threaded into the passage 334. The screw 336 and anchor 320 are pushed axially to a point where at least one of the feet (such as foot 340b) exits the hole 322 on an inner surface 326 of the wall 324. The corresponding leg 338b then resiliently snaps generally radially outwardly. Once the foot 340b exits the hole 322, the screw 336 is threaded into the passage 334 to urge the foot 340b against the inner surface 326 of the wall 324. A washer 348, positioned on the screw 336, is adapted to engage the outer surface 328 of the wall 324 when the screw 336 is threaded into the passage 334. Threading the screw 336 into the passage 334 also urges the other legs (such as leg 338d) radially outwardly to drive the corresponding feet (such as foot 340d) into the wall 324. Once the feet are driven into the wall 324, the anchor 320 remains secured in the hole 322 even if the screw 336 is removed.

Another embodiment of an anchor constructed according to the principles of this invention is indicated generally at 420 in FIGS. 12–17. The anchor 420 comprises a series of anchor members 423 each having an elongate body 432, a head 430 at a first end 450 of the body 432, and a foot (holder) 440 at a second end 452 of the body 432. The head 430 and foot 440 project laterally outwardly from the body at an outer side 454 of the body 432. The members 423 are integrally and flexibly attached to one another in side-by-side relation to form a strip of interconnected anchor members. Preferably, each anchor member 423 is a one-piece member of molded plastic construction, and adjacent anchor members are connected by integral "living" hinges 456 (see FIG. 15) which permit the strip to be rolled up to form a roll of anchor members 423 and then inserted in a hole through a wall. The surface of the outer side 454 has a plurality of longitudinal ridges or ribs to prevent the anchor 420 from rotating within the hole 422.

As shown in FIGS. 16 and 17, the strip comprises four anchor members 423 rolled up to form a roll of anchor members 423 with the heads 430 and feet 440 of the members 423 projecting generally radially outwardly relative to a central longitudinal axis 442 of the roll. The roll is inserted in a hole 422 through a wall 424 with the roll defining a passage 434 into which a screw may be threaded. As the screw is threaded into the passage 434 it forces the anchor members 423 radially outwardly to a position where the heads 430 engage an outer surface 428 of the wall 424 and where the feet 440 engage an inner surface 426 of the wall 424 to secure the roll in fixed position in the hole 422. Although the roll shown in FIGS. 16 and 17 includes four anchor members 423, it is to be understood that such a roll could have more or fewer anchor members to accommodate larger or smaller holes. Preferably, such rolls are formed from portions of strips. For example, a long strip is cut or torn into portions to form various sizes of smaller strips. Each of the smaller strips are then rolled up for insertion into holes. Thus, various size rolls can be formed from the same strip.

FIGS. 18 and 19 show another embodiment of an anchor, designated generally at 520, constructed according to the principles of this invention. The anchor 520 is similar to the anchor 420 of FIGS. 12–17 except the anchor 520 is headless. For convenience, corresponding parts are numbered the same as those parts shown in FIGS. 12–17 except the prefix "5" has been substituted for the prefix "4" in the reference numbers.

The anchor 520 comprises a series of anchor members 523 each having an elongate body 532, and a foot (holder) 540. The foot 540 projects laterally outwardly from the body at an outer side of the body 532. As shown in FIG. 19, the strip comprises many anchor members 523 rolled up and inserted in a large hole 522 through a wall 524. Of course the strip could be formed of fewer members 523 to accommodate smaller holes.

FIGS. 20 and 21 show another embodiment of a screw anchor, designated generally at 620, constructed according to the principles of this invention. The anchor 620 is similar to the anchor 420 of FIGS. 12-17 but anchor 620 can accommodate walls of different thicknesses. For convenience, corresponding parts are numbered the same as those parts shown in FIGS. 12-17 except the prefix "6" has been substituted for the prefix "4" in the reference numbers.

The anchor 620 comprises a series of anchor members 623 each having an elongate body 632, a head 630 at a first end 650 of the body 632, and a foot 640 projecting laterally of the body 632. The feet 640 are spaced at intervals lengthwise of the bodies 632 for accommodating walls of different thicknesses.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. An anchor for insertion in a hole through a wall, said wall having inner and outer surfaces with the hole extending inwardly through the wall from the outer surface of the wall to the inner surface of the wall, said anchor comprising a body having a passage therethrough into which a fastener, such as a screw, is adapted to be inserted, said passage having a central longitudinal axis, a plurality of resiliently flexible legs extending axially of the body and terminating in free ends movable generally radially inward and outward relative to the central axis, and a single holder on each leg projecting laterally outwardly from the leg, said holders being spaced at intervals axially of the body for accommodating walls of different thicknesses, said legs being adapted to resiliently flex generally radially inwardly as the body is inserted in the hole to a point where at least one of said holders exits the hole on the inner surface of the wall, the leg of said one holder thereafter being adapted to flex generally radially outwardly to a position wherein the holder extends beyond the hole and overlaps the inner surface of the wall to resist pulling of the body back through the hole.

2. An anchor as set forth in claim 1 further comprising a head integrally formed at one end of the body and engageable with the outside surface of the wall when the body is fully inserted in the hole, said passage through the body extending through the head.

3. An anchor as set forth in claim 1 wherein said legs are resilient whereby the holder on each leg is adapted to snap radially outwardly when it clears the hole.

4. An anchor as set forth in claim 3 wherein said holder comprises a foot projecting radially outwardly from the leg.

5. An anchor as set forth in claim 3 wherein said foot includes a sloped surface engageable with the wall as the anchor is pulled axially rearwardly with a force sufficient to cam the foot inwardly out of engagement with the wall to permit the anchor to be removed from the hole in the wall.

6. An anchor as set forth in claim 4 wherein said anchor is a one-piece member of molded plastic construction.

7. An anchor as set forth in claim 1 wherein said body is generally cylindric in shape, each leg being an integral extension of the body of arcuate cross section.

8. A headless anchor for insertion in a hole through a wall, said wall having inner and outer surfaces with the hole extending inwardly through the wall from the outer surface of the wall to the inner surface of the wall, said anchor having a leading end and a trailing headless end so that the trailing end can freely pass into the hole, said anchor comprising a body having a passage therethrough into which a fastener, such as a screw is adapted to be inserted, said passage having a central longitudinal axis, at least one resiliently flexible leg extending axially of the body and terminating in a free end movable generally radially inward and outward relative to the central axis, and a holder adjacent the free end of the leg projecting laterally outwardly from the leg, said legs being adapted to resiliently flex generally radially inwardly as the body is inserted in the hole to a point where said holder exits the hole on the inner surface of the wall, said leg thereafter being adapted to flex generally radially outwardly to a position wherein the holder extends beyond the hole and overlaps the inner surface of the wall to resist pulling of the body back through the hole.

9. An anchor as set forth in claim 8 wherein said body has a plurality of flexible legs extending axially of the body and terminating in free ends movable generally radially inward and outward relative to said central axis, and a single holder on each leg projecting laterally outwardly from the leg, said holders being spaced at intervals axially of the body for accommodating walls of different thicknesses, said legs being adapted to resiliently flex generally radially inwardly as the body is inserted in the hole to a point where at least one of said holders exits the hole on the inner surface of the wall, the leg of said one holder thereafter being adapted to flex generally radially outwardly to a position wherein the holder extends beyond the hole and overlaps the inner surface of the wall to resist pulling of the body back through the hole.

10. An anchor as set forth in claim 9 wherein said legs are resilient whereby the holder on each leg is adapted to snap radially outwardly when it clears the hole.

11. An anchor as set forth in claim 10 wherein said holder comprises a foot projecting radially outwardly from the leg.

12. An anchor as set forth in claim 11 wherein said foot includes a sloped surface engageable with the wall as the anchor is pulled axially rearwardly with a force sufficient to cam the foot inwardly out of engagement with the wall to permit the anchor to be removed from the hole in the wall.

13. An anchor as set forth in claim 10 wherein said anchor is a one-piece member of molded plastic construction.

14. An anchor as set forth in claim 13 wherein said body is generally cylindric in shape, each leg being an integral extension of the body of arcuate cross section.

15. A series of anchor members, each having an elongate body and a holder spaced lengthwise of the body from one end of the body and projecting laterally outwardly from the body at one side of the body, said members being integrally and flexibly attached to one another in side-by-side relation by hinges to form a strip of interconnected anchor members, said strip being adapted to be rolled up to form a roll of anchor members with at least one of the members overlapping another of the members and with the holders of the anchor members projecting generally radially outwardly relative to a central longitudinal axis of the roll, said roll being adapted to be inserted in a hole through a wall with the roll defining a passage into which a fastener, such as a screw, may be inserted, said fastener as it is inserted into the passage being adapted to force said anchor members radially outwardly to a position wherein one or more of said holders are engageable with an inner surface of the wall to secure the roll in fixed position in the hole.

16. A series of anchor members as set forth in claim 15 wherein each of said anchor members is headless.

17. A series of anchor members as set forth in claim 15 wherein each anchor member has a head at said one end of the body projecting laterally outwardly from the body at said one side of the body, said heads projecting generally radially outwardly relative to the central longitudinal axis of said roll when said strip is rolled up to form said roll, and one or more of said heads being engageable with an outer surface of the wall when said roll, is inserted in said hole.

18. A series of anchor members as set forth in claim 15 wherein the holder on each anchor member comprises a foot projecting laterally outwardly from the body, said feet projecting generally radially outwardly relative to the central longitudinal axis of said roll when said strip is rolled up to form said roll, and one or more of said feet being engageable with an inner surface of the wall when said roll is inserted in said hole.

19. A series of anchor members as set forth in claim 15 wherein each anchor member is a one piece member of molded plastic construction.

20. A series of anchor members as set forth in claim 15 wherein each anchor member has only one holder, the holders being spaced at intervals lengthwise of the body from said one end of the body for accommodating walls of different thicknesses.

* * * * *